United States Patent [19]

McEntire et al.

[11] 4,251,637

[45] Feb. 17, 1981

[54] TERTIARY AMINO SUBSTITUTED OXAZOLIDINES AS POLYISOCYANURATE CATALYSTS

[75] Inventors: Edward E. McEntire; Robert L. Zimmerman, both of Austin; Howard P. Klein, Houston, all of Tex.

[73] Assignee: Texaco Development Corporation, White Plains, N.Y.

[21] Appl. No.: 75,437

[22] Filed: Sep. 13, 1979

[51] Int. Cl.$^3$ .............................................. C08G 18/20
[52] U.S. Cl. .................................... 521/115; 521/129; 528/53; 544/137; 548/215
[58] Field of Search ................... 521/115, 129; 528/53; 544/137; 548/215

[56] References Cited

U.S. PATENT DOCUMENTS

| | | | |
|---|---|---|---|
| 2,993,869 | 7/1961 | Gmitten et al. | 528/53 |
| 3,645,925 | 2/1972 | Speranza et al. | 528/53 |
| 4,115,302 | 9/1978 | Mao | 521/115 |

*Primary Examiner*—Maurice J. Welsh
*Attorney, Agent, or Firm*—Carl G. Ries; Robert A. Kulason; Kenneth R. Priem

[57] ABSTRACT

The use of tertiary amino substituted oxazolidines as polyisocyanurate catalysts is disclosed. Said catalysts are useful in promoting the reaction between a polyol and an aromatic polyisocyanate to prepare a polymer containing recurring isocyanurate and urethane linkages.

5 Claims, No Drawings

TERTIARY AMINO SUBSTITUTED OXAZOLIDINES AS POLYISOCYANURATE CATALYSTS

BACKGROUND OF THE INVENTION

1. Field of the Invention

This invention relates to the preparation of polyisocyanurate polymers such as polymer foams, and is more particularly concerned with use of a class of catalyst which promote the trimerization of polyisocyanates to polyisocyanurate polymers.

2. Description of the Prior Art

Polyisocyanurate polymers such as rigid polyisocyanurate foams are known in the art. The prior art discloses methods for preparing such polymers by reacting an organic polyisocyanate with a polyether or polyester polyol utilizing a polyisocyanurate group formation catalyst. Foams are prepared by effecting such reaction in the presence of a blowing agent. In the optimum situation the isocyanurate catalyst utilized promotes formation of both isocyanurate linkages and urethane linkages to produce urethane-modified polyisocyanurate polymers. See, for example, U.S. Pat. Nos. 3,516,950; 3,580,868; 3,620,986; 3,625,872; 3,635,848; 3,725,319; and 3,745,133.

Compounds which are known as catalysts for polyisocyanurates are the N-alkali metal and N-alkaline earth metal compounds of primary and secondary aliphatic, araliphatic, aromatic amines and heterocyclic amines. Amines which may be employed are, for example, methylamine, N-butylamine, tert.-butylamine, methoxy-n-propylamine, oleylamine, diethylamine, di-n-butylamine, diisobutylamine, dicyclohexylamine, N-methylstearylamine, benzylamine, ethylbenzylamine, dibenzylamine, phenylbenzylamine, aniline, naphthylamine, 3-N-ethylaminotoluene, toluidine, methylaniline, N-isobutylaniline, diphenylamine, N-methylanisidine, and also pyrrolidine, piperidine, 1,2,3,4,-tetrahydroquinoline, pyrrole, indole, 2-methylindole, 2,3,-dimethylindole, 5-methoxy-2,3-dimethylindole, carbazole, 3,6,-dinitrocarbazole, N,N'-dimethylethylenediamine and N,N'-dimethyl-p-phenylenediamine.

N-alkali metal and N-alkaline earth metal compounds of carboxylic acid amides are also known catalysts. These include aliphatic and aromatic carboxylic acid amides and also such cyclic acid amides as imides and lactams. The following compounds are examples of compounds suitable for the production of such N-metal compounds: acetamide, trimethylacetamide, myristinic acid amide, stearoyl amide, N-methylacetamide, phenylacetamide, benzamide, N-alkyl benzamides, succinimide, tetrapropenyl succinimide, phthalimide, pyrrolidone, butyrolactam, caprolactam, phthalimidine and saccharine.

Also, as catalysts alkali or alkaline earth metal may be combined with the amines or carboxylic acid amides such as, for example, lithium, sodium, potassium, magnesium, barium, and calcium, with the preferred metals being lithium, sodium, potassium and calcium.

Also, alkali or alkaline earth metal salts of carboxylic acids are useful as catalysts for isocyanurate polymers.

Due to the dual nature of these polyurethane/isocyanurate polymers, primary and secondary rises occur during reaction. Often the secondary rise is too fast, resulting in poor cell structure and poor adhesion for sprayed foam.

Our invention solves this problem by use of a novel catalyst system.

SUMMARY OF THE INVENTION

This invention comprises a novel process for preparing a polymer containing recurring isocyanurate and urethane linkages, which polymer comprises a reaction product of a polyol and an aromatic polyisocyanate utilizing as an isocyanurate formation catalyst a particularly useful and novel specific class of compounds known as tertiary amino substituted oxazolidines falling within the formula:

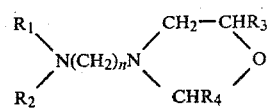

Where $R_1$ and $R_2$ = lower alkyl, morpholino and cycloaliphatic and $R_3$ = H and lower alkyl, $R_4$ = H, lower alkyl and $n$ = 2 to about 4. The invention is also the novel catalysts compositions described above.

DESCRIPTION OF THE PREFERRED EMBODIMENTS

The catalyst useful in this invention are tertiary amino substituted oxazolidines. These materials are useful as catalysts for the production of isocyanurate either used alone or in combination with other known catalysts. Compounds having the general formula depicted in the summary of the invention are included within the scope of our invention.

Preparation of these materials is generally effected as follows:

A tertiary-primary 1,2,- or 1,3-diamine $R_1R_2N(CH_2)_nNH_2$ is added to an olefin oxide,

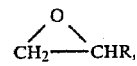

usually at elevated temperatures. This hydroxy alkylated amine, $R_1R_2N(CH_2)_nNHCH_2CHR_3OH$, is treated with an aldehyde such as formaldehyde to form the oxazolidine which is useful as a catalyst. Purification of the intermediate hydroxyalkyl amine is desirable but not necessary, and may be effected by distillation.

The catalysts of this invention are surprisingly effective in catalyzing the isocyanurate reaction since the combination of a tertiary amine function and an oxazolidine function were not heretofore known to result in an isocyanurate catalyst. Furthermore, the catalysts of this invention are particularly advantageous over other catalysts in that they give a more desirable reaction profile during polymer resin preparation and a more complete cure to the final product resin. A smooth even rise is observed instead of a rise with two different rates.

The catalysts of this invention may be used alone but it is particularly advantageous that they be used in combination with other catalysts such as potassium 2-ethyl hexanoate, potassium acetate, (metallic carboxylic acid salts), quaternary ammonium carboxylates and alkali metal salts of amides, etc. in order to achieve a smooth even rate of rise instead of a rise that has two distinct rates and, therefore, a more desirable reaction profile and polymer formation.

The examples which follow depict the preparation of the catalyst of this invention and the use of these catalysts to prepare isocyanurate foams.

EXAMPLE I

Preparation of 3-Dimethylaminopropyl-2-hydroxyethyl Amine

To a one liter stirred autoclave was charged 500 g 3-dimethylaminopropyl amine. A nitrogen atmosphere was provided and the sealed autoclave was heated to 115°C. Ethylene oxide (140 g) was added incrementally over 3 hours. Heating was continued for 15 minutes.

Distillation gave 191 g of the desired amine, b 84° (0.5 mm Hg). Titration showed 13.7 meg/g total amine (theory 13.7). Infrared analysis confirmed the expected structure.

EXAMPLE II

Preparation of 3-(3-Dimethylaminopropyl)oxazolidine

To a 250 ml reactor equipped with a stirrer, thermometer, 12 inch vigreaux column, distillation take-off head, and addition funnel were charged 50 g 3-dimethylaminopropyl-2-hydroxyethyl amine and 50 g anhydrous methanol. Formalin (28 g) was added dropwise over 25 minutes which caused an exotherm to 38°. Additional heat was supplied and methanol was distilled to a temperature of 85°. Vacuum was applied and distillation continued to provide the oxazolidine, 50 g, b 110 (30 mm Hg). Amine titration showed 12.6 meg/g total amine (theory 12.66). Infrared analysis confirmed the structure.

EXAMPLES III-IX

By procedures analagous to Examples I and II, the following amines and oxazolidines were prepared:

| Example | |
|---|---|
| 3 3-N-Morpholinopropyl-2-hydroxyethyl amine | b. 101 (0.03mm Hg) |
| 4 2-Dimethylaminoethyl-2-hydroxyethyl amine | b. 60 (0.25mm Hg) |
| 5 3-Dimethylaminopropyl-2-hydroxypropyl amine | b. 120 (3.7mm Hg)* |
| 6 3-(3-N-Morpholinopropyl) oxazolidine | b. 83-93 (0.17mm Hg) |
| 7 3-(2-Dimethylaminoethyl) oxazolidine | b. 70 (8.0mm Hg) |
| 8 3-(3-Dimethylaminopropyl)-5-methyl oxazolidine** | b. 53 (0.2mm Hg) |
| 9 3-(3-Dimethylaminopropyl)-2-methyl oxazolidine*** | b. 115 (10mm Hg) |

*Material 82% pure by glc.
**A toluene azeotrope was used to remove water. No methanol was added.
***Acetaldehyde was added to the amine of Example 1 with no solvent, then distilled.

Examples 12 and 13 demonstrate that these compounds are isocyanurate catalysts. Examples 10, 11, and 14 show their use with a co-catalyst. In example 15, potassium octoate is the sole catalyst. The foam produced had a severe (very rapid) secondary rise. The foam in examples 10, 11 and 14 did not have this severe secondary rise but gave a smooth rise. The severe secondary rise distorts the cell structure and contributes to poor adhesion.

| Example | 10 | 11 | 12 | 13 | 14 | 15 |
|---|---|---|---|---|---|---|
| Polyol[1] | 10.1 | 10.1 | 9.9 | 9.9 | 9.9 | 9.9 |
| Silicone DC-193[2] | 0.5 | 0.5 | 1.5 | 1.5 | 1.5 | 1.5 |
| Trichlorofluoromethane | 12 | 12 | 12.5 | 12.5 | 12.5 | 12.5 |
| 50% potassium octoate in a glycol | 1.0 | 0.0 | — | — | 0.8 | 1.5 |
| 3-(3-dimethylaminopropyl)-oxazolidine | 0.5 | — | — | — | — | — |
| 3-(3-dimethylaminoethyl) oxazolidine | — | 0.5 | — | — | — | — |
| 3-(3-dimethylaminopropyl)-5-methyl oxazolidine | — | — | 1.5 | — | 0.5 | — |
| 3-(3-dimethylaminopropyl)-2-methyl oxazolidine | — | — | — | 1.5 | — | — |
| Mondur MR[3] | 76.3 | 76.0 | 74.6 | 74.6 | 74.6 | 74.6 |
| Reaction profile | | | | | | |
| Cream time (seconds) | 6 | 7 | 6 | 6 | 6 | 7 |
| Tack free time (seconds) | 25 | 50 | 60 | 60 | 35 | >180 |
| Rise time (seconds) | 50 | 35 | 70 | 70 | 45 | 40 |

[1] Polyol prepared from 1 mole of trimethylol propane and 3 moles of ethylene oxide.
[2] A silicone surfactant sold by Dow Corning.
[3] A polymeric isocyanate having a functionality of about 2.7 and equivalent weight of about 134 sold by Mobay Chemical Co.

We claim:

1. In a process for preparing a polymer containing recurring isocyanurate and urethane linkages, which polymer comprises the reaction product of a polyol and an aromatic polyisocyanate, while utilizing an isocyanurate group formation catalyst; the improvement which comprises
   employing as said isocyanurate catalyst a tertiary amino substituted oxazolidine falling within the following structural formula

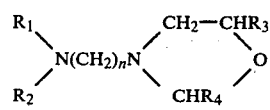

where $R_1$ and $R_2$ taken singly are lower alkyl groups or $R_1$ and $R_2$ taken jointly together with the adjacent nitrogen atom are cycloalkyl or morpholino and $R_3$ and $R_4$ are each taken from the group consisting of hydrogen and lower alkyl and n is about 2 to 4.

2. The process of claim 1 where said polyol is a polyether or polyester polyol.

3. The process of claim 1 wherein said polymer is a cellular polymer obtained by reacting said polyols in said polyisocyanate in the presence of a blowing agent.

4. The process of claim 3 wherein a rigid polyisocyanurate foam is produced.

5. A polyisocyanurate catalyst compound having a structural formula as follows:

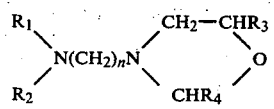

where $R_1$ and $R_2$ taken singly are lower alkyl groups or $R_1$ and $R_2$ taken jointly together with the adjacent nitrogen atom are cycloalkyl or morpholino and $R_3$ and $R_4$ are each taken from the group consisting of hydrogen and lower alkyl and n is about 2 to 4.

* * * * *